US012182330B1

(12) United States Patent
Wang et al.

(10) Patent No.: US 12,182,330 B1
(45) Date of Patent: Dec. 31, 2024

(54) THREE-DIMENSIONAL VIBRATION CONTROL METHOD, APPARATUS, DEVICE, AND STORAGE MEDIUM

(71) Applicant: AAC Acoustic Technologies (Shanghai) Co., Ltd., Shanghai (CN)

(72) Inventors: Xiuyue Wang, Shanghai (CN); Wenbiao Xu, Shanghai (CN); Xia Zheng, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/399,760

(22) Filed: Dec. 29, 2023

Related U.S. Application Data

(63) Continuation of application No. PCT/CN2023/122717, filed on Sep. 28, 2023.

(51) Int. Cl.
*G06F 3/01* (2006.01)
*G06F 1/16* (2006.01)
*G06F 3/0346* (2013.01)

(52) U.S. Cl.
CPC ............ *G06F 3/016* (2013.01); *G06F 1/1641* (2013.01); *G06F 3/0346* (2013.01)

(58) Field of Classification Search
None
See application file for complete search history.

(56) References Cited

U.S. PATENT DOCUMENTS

| | | | |
|---|---|---|---|
| 11,137,894 B1* | 10/2021 | Chen | G06F 3/04855 |
| 11,972,100 B1* | 4/2024 | Mahath | G06F 3/04886 |
| 2013/0009907 A1* | 1/2013 | Rosenberg | G06F 3/046 345/174 |
| 2017/0185289 A1* | 6/2017 | Kim | G06F 1/1626 |
| 2017/0300205 A1* | 10/2017 | Villa | G06F 3/04842 |
| 2018/0018753 A1* | 1/2018 | McLaughlin | G06F 1/1626 |
| 2020/0125144 A1* | 4/2020 | Chung | H04M 1/0216 |
| 2020/0125194 A1* | 4/2020 | Jiang | G06F 1/1677 |
| 2020/0126519 A1* | 4/2020 | Heo | G06F 3/0488 |
| 2023/0075360 A1* | 3/2023 | Ron | G06F 3/038 |
| 2024/0077956 A1* | 3/2024 | Lee | G06F 3/04883 |

* cited by examiner

*Primary Examiner* — Matthew Yeung
(74) *Attorney, Agent, or Firm* — W&G Law Group

(57) ABSTRACT

A three-dimensional vibration control method includes: acquiring, when a trigger event is received, current state data of the electronic device and application software information associated with the trigger event; determining a holding type corresponding to the trigger event according to current state data and application software information; wherein holding type includes fully folded vertical one-handed holding, fully folded horizontal two-handed holding, half folded horizontal two-handed holding, fully unfolded vertical two-handed holding, and fully unfolded horizontal two-handed holding; determining a corresponding vibration scheme according to the holding type; and controlling the actuators to enter a vibration operating state correspondingly based on the vibration scheme. After a type of holding a device by a user is determined, a vibration scheme of a corresponding type is adopted, so as to control the corresponding actuators for vibration feedback in real time to make three-dimensional vibration response to different trigger events, which improves vibration experience.

9 Claims, 9 Drawing Sheets

First manner

Second manner

Third manner

Fourth manner

Fifth manner

THREE-DIMENSIONAL VIBRATION CONTROL METHOD, APPARATUS, DEVICE, AND STORAGE MEDIUM

CROSS-REFERENCE TO RELATED APPLICATIONS

This application is a continuation of International Application No. PCT/CN2023/122717, filed on Sep. 28, 2023, which is hereby incorporated by reference in its entirety.

TECHNICAL FIELD

The present disclosure relates to the field of electronics technologies, and in particular, to a three-dimensional vibration control method, an apparatus, a device, and a storage medium.

BACKGROUND

Touch is an important manner for people to perceive the world. In some relatively abstract scenes without sound and picture conditions, being different from vision and hearing, touch can bring users accurate judgment and rich information tips, and therefore has great application value. With the continuous rise of markets such as a mobile phone industry, a game industry, and a VR industry in the field of touch, haptic feedback in the form of vibration has been widely used in electronic consumer products. For common terminal devices such as folding-screen mobile phones, vibration forms thereof are generally single-direction and single-frequency, and control manners in different holding forms are generally unified control. This single-dimensional vibration and control manner has limited richness, which greatly reduces user experience. Currently, there is no three-dimensional vibration scheme for the folding-screen mobile phones on the market. In order to meet this requirement of the market, it is urgent to design a vibration control scheme that can effectively achieve three-dimensional vibration in related art.

SUMMARY

A main objective of the present disclosure is to provide a three-dimensional vibration control method, an apparatus, a device, and a storage medium, which can solve at least the problem in the related art that the vibration dimension and the control manner are single and cannot meet a user requirement.

In order to achieve the above objective, in a first aspect of the present disclosure, a three-dimensional vibration control method is provided. The method is applied to an electronic device including a folding screen, in which the electronic device includes a plurality of actuators, and the folding screen is foldable to form at least two screens. The three-dimensional vibration control method includes: acquiring, when a trigger event acting on the folding screen is received, current state data of the electronic device and application software information associated with the trigger event; determining a holding type corresponding to the trigger event according to the current state data and the application software information, in which the holding type includes fully folded vertical one-handed holding, fully folded horizontal two-handed holding, half folded horizontal two-handed holding, fully unfolded vertical two-handed holding, and fully unfolded horizontal two-handed holding; determining a corresponding vibration scheme according to the holding type; and controlling the actuators to enter a vibration operating state correspondingly based on the vibration scheme.

In a second aspect of the present disclosure, a three-dimensional vibration control apparatus applied to an electronic device including a folding screen is provided. The electronic device includes a plurality of actuators, and the folding screen is foldable to form at least two screens. The apparatus includes: an acquisition module configured to acquire, when a trigger event acting on the folding screen is received, current state data of the electronic device and application software information associated with the trigger event; a first determination module configured to determine a holding type corresponding to the trigger event according to the current state data and the application software information, in which the holding type includes fully folded vertical one-handed holding, fully folded horizontal two-handed holding, half folded horizontal two-handed holding, fully unfolded vertical two-handed holding, and fully unfolded horizontal two-handed holding; a second determination module configured to determine a corresponding vibration scheme according to the holding type; and a control module configured to control the actuators to enter a vibration operating state correspondingly based on the vibration scheme.

In a third aspect of the present disclosure, an electronic device is provided, including: actuators, a memory, and a processor, in which the processor is configured to execute a computer program stored in the memory; and the processor, when executing the computer program, implements steps in the three-dimensional vibration control method provided in the first aspect of the present disclosure.

In a fourth aspect of the present disclosure, a non-transitory computer-readable storage medium is provided. The non-transitory computer-readable storage medium stores a computer program thereon, in which, when the computer program is executed by a processor, steps in the three-dimensional vibration control method provided in the first aspect of the present disclosure are implemented.

As can be seen, according to the three-dimensional vibration control method and apparatus, the device, and the storage medium provided in the solutions of the present disclosure, when a trigger event acting on a folding screen is received, current state data of the electronic device and application software information associated with the trigger event are acquired; a holding type corresponding to the trigger event is determined according to the current state data and the application software information; in which the holding type includes fully folded vertical one-handed holding, fully folded horizontal two-handed holding, half folded horizontal two-handed holding, fully unfolded vertical two-handed holding, and fully unfolded horizontal two-handed holding; a corresponding vibration scheme is determined according to the holding type; and the actuators are controlled to enter a vibration operating state correspondingly based on the vibration scheme. Through implementation of the solutions of the present disclosure, after a type of holding a device by a user is determined, a vibration scheme of a corresponding type is adopted, so as to control the corresponding actuators for vibration feedback in real time to make three-dimensional vibration response to different trigger events, which improves vibration experience.

BRIEF DESCRIPTION OF DRAWINGS

In order to more clearly illustrate the technical solutions in embodiments of the present disclosure or the related art, the accompanying drawings used in the description of the embodiments or the related art will be briefly introduced below. The accompanying drawings in the following description are only some embodiments of the present disclosure, and other drawings can be obtained by those of ordinary skill in the art from the provided drawings.

DESCRIPTION OF EMBODIMENTS

In order to make the objectives, features, and advantages of the present disclosure more obvious and understandable, the technical solutions in the embodiments of the present disclosure will be described clearly and completely below with reference to the accompanying drawings in the embodiments of the present disclosure. It is apparent that the described embodiments are merely some of rather than all of the embodiments of the present disclosure. All other embodiments acquired by those skilled in the art without creative efforts based on the embodiments of the present disclosure shall fall within the protection scope of the present disclosure.

In addition, the terms "first" and "second" are used for descriptive purposes only, which cannot be construed as indicating or implying a relative importance, or implicitly specifying the number of the indicated technical features. Therefore, the features defined with "first" and "second" may explicitly or implicitly include one or more features. In the description of the embodiments of the present disclosure, "a plurality of" means two or more, unless specifically stated otherwise.

Figure 1:
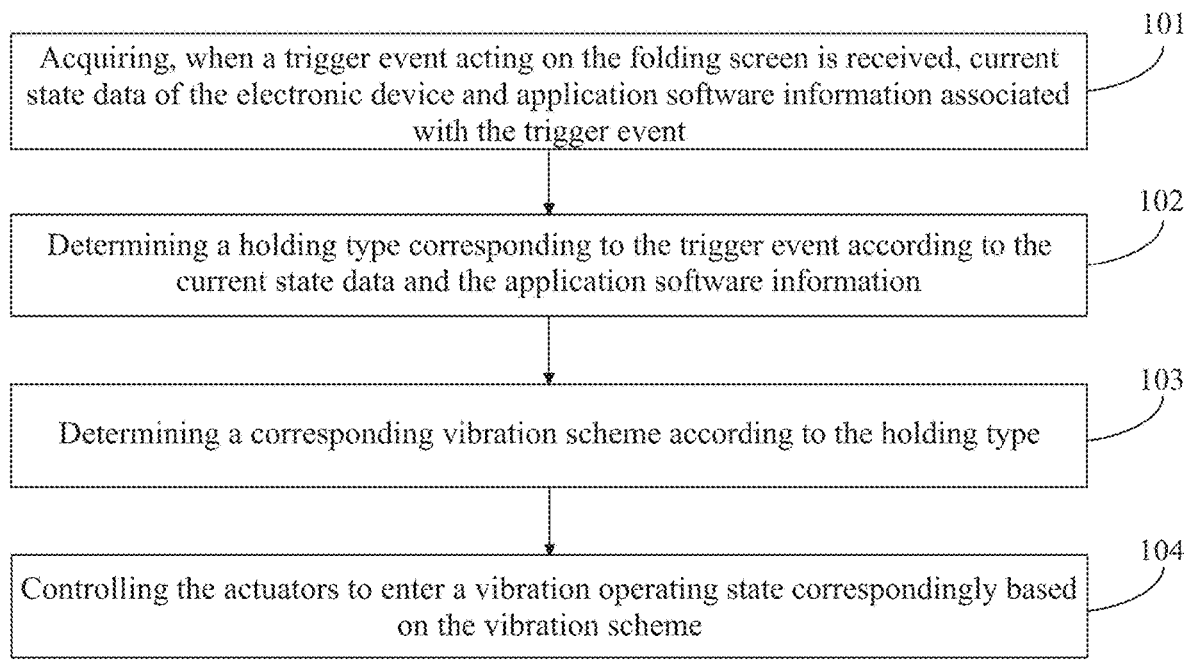
FIG. 1 is a schematic basic flowchart of a three-dimensional vibration control method according to Embodiment 1 of the present disclosure.

In order to solve the problem in the related art that the vibration dimension and the control manner are single and cannot meet user's requirements, in Embodiment 1 of the present disclosure, a three-dimensional vibration control method applied to an electronic device including a folding screen is provided. The electronic device includes a plurality of actuators, and the folding screen is foldable to form at least two screens. FIG. 1 is a schematic basic flowchart of the three-dimensional vibration control method provided in this embodiment. The three-dimensional vibration control method includes the following steps.

In step 101, when a trigger event acting on the folding screen is received, current state data of the electronic device and application software information associated with the trigger event are acquired.

In this embodiment, when an electronic device such as a folding-screen mobile phone enters an application software interface under an instruction entered by a user, various built-in sensors of the folding-screen mobile phone may monitor, in real time, a trigger event that the user acts on the folding screen. Once the trigger event is detected, current state data of the folding-screen mobile phone uploaded by the sensors and application software information that the trigger event acts on may be acquired. The application software information may be acquired from background running data of the mobile phone.

In this embodiment, prior to the step of acquiring current state data of the electronic device and application software information associated with the trigger event, the method further includes: acquiring feature state data corresponding to the trigger event; in which the feature state data includes operating pressure data, operating displacement data, and operating frequency data; matching values of the feature state data with a corresponding preset threshold range; and performing the step of acquiring current state data of the electronic device and application software information associated with the trigger event when the matching is successful; in which the current state data includes angular velocity data and gravity data.

In this embodiment, when the user's trigger event is detected, feature state data of the user's trigger operation may be first acquired, such as operational displacement data, pressure data, and frequency data, and the data is matched with respective reference threshold ranges, to determine whether a current trigger event is an event that requires vibration feedback. The preset respective reference threshold ranges correspond to state data ranges of corresponding types of vibration feedback events. When any one or more of the feature state data is successfully matched, current state data of the electronic device and the application software information associated with the trigger event are further determined. The current state data of the electronic device may be angular velocity data, gravity data, or the like.

In step 102, a holding type corresponding to the trigger event is determined according to the current state data and the application software information.

In this embodiment, the holding type of the user operating the electronic device may be determined through the current state data of the electronic device uploaded by the sensors and the application software information. Several common holding types may be four holding manners in the schematic diagram of holding manners of a folding-screen mobile phone shown in FIG. 2. The first manner is fully folded vertical one-handed holding, the second manner is fully folded horizontal two-handed holding, the third manner is fully unfolded vertical two-handed holding, the fourth manner is half folded horizontal two-handed holding, and the fifth manner is fully unfolded horizontal two-handed holding.

In this embodiment, the step of determining a holding type corresponding to the trigger event according to the current state data and the application software information includes: determining an orientation of the folding screen relative to a device user based on the current state data; and determining the holding type corresponding to the trigger event according to the orientation and identification information of application software.

In this embodiment, a use state and a holding posture of the user may be determined through the built-in sensors of the electronic device and a running state of the application software. For example, an orientation of the screen of the mobile phone may be determined through a built-in gyroscope or gravity sensor of the mobile phone, and how the user uses the mobile phone in this case is further judged in conjunction with identification information of application software that the user is using and related operations (such as operating a game), thereby achieving accurate judgment of the holding posture of the user. In another embodiment, the holding type corresponding to the trigger event may alternatively be determined according to either of an orientation of the folding screen relative to a device user and the application software information. In this embodiment, in order to improve accuracy of the judgment, it is optional to use the above two types of information for judgment.

In step 103, a corresponding vibration scheme is determined according to the holding type.

In this embodiment, after a current holding type of the user is determined, the corresponding vibration scheme may be selected from a preset vibration scheme library, and the corresponding vibration scheme may alternatively be generated in real time to better match the trigger event, thereby improving the user's operating experience.

In this embodiment, the step of determining a corresponding vibration scheme according to the holding type includes: determining a set orientation of to-be-controlled actuators according to the holding type; in which the set orientation includes: a left-right orientation and an up-down orientation; and determining the vibration scheme according to actuator IDs corresponding to the set orientation and feature state data of the trigger event.

In this embodiment, in order to generate a three-dimensional vibration haptic sensation under different holding types, there is a need to set a corresponding placement manner and a number of actuators. Therefore, there is a need to first determine a placement orientation of actuators corresponding to the holding type and then determine a vibration scheme according to IDs corresponding to the actuators in the placement orientation and the feature state data of the trigger event such as operating pressure data, operating displacement data, and operating frequency data.

Further, in this embodiment, the step of determining a set orientation of to-be-controlled actuators according to the holding type includes: determining, when the holding type is the fully folded vertical one-handed holding, the set orientation of the to-be-controlled actuators to be the left-right orientation or the up-down orientation of the folding screen in a vertical state; determining, when the holding type is the fully unfolded vertical two-handed holding, the set orientation of the to-be-controlled actuators to be the left-right orientation of the folding screen in the vertical state; and determining, when the holding type is the half folded horizontal two-handed holding, the fully unfolded horizontal two-handed holding, and the fully folded horizontal two-handed holding, the set orientation of the to-be-controlled actuators to be the left-right orientation of the folding screen in a horizontal state.

Figure 2:
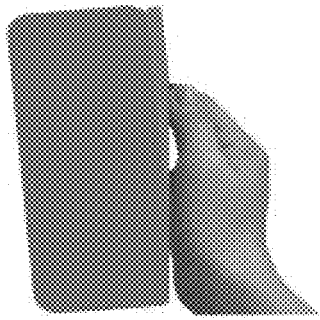
FIG. 2 is a schematic diagram of a holding manner of a folding-screen mobile phone according to Embodiment 1 of the present disclosure.
Figure 2:
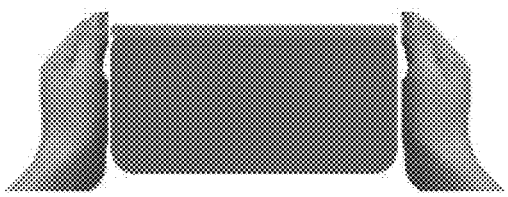
Figure 2:
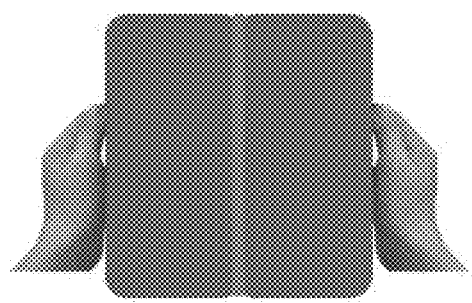
Figure 2:
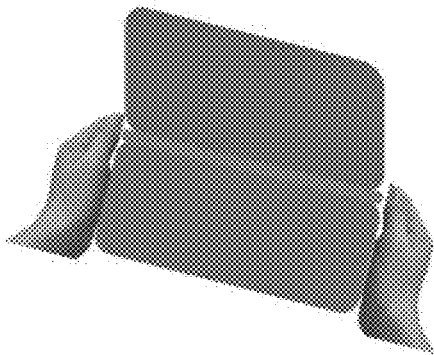
Figure 2:
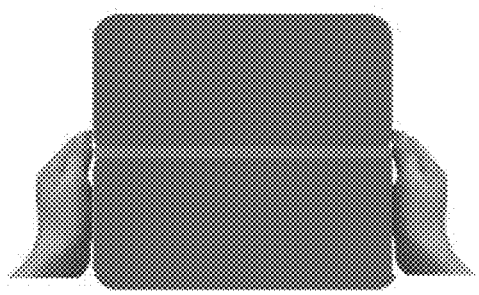

In this embodiment, when the holding type is the fully folded vertical one-handed holding in the first manner as shown in FIG. 2, which is the same as a holding manner of a non-folding-screen mobile phone, to achieve three-dimensional vibration, at least one actuator is required to be placed in the left-right orientation or the up-down orientation. For the fully unfolded vertical two-handed holding in the third manner as shown in FIG. 2, three-dimensional vibration may be achieved by placing at least one actuator in each of left and right orientations of the bottom of the screen in a vertical mode. For the fully folded horizontal two-handed holding, the half folded horizontal two-handed holding, and the fully unfolded horizontal two-handed holding in the second manner, the fourth manner, and the fifth manner as shown in FIG. 2, three-dimensional vibration may be achieved by placing at least one actuator in each of left and right orientations of the bottom of the screen in a horizontal mode.

Furthermore, in this embodiment, the step of determining the vibration scheme according to actuator IDs corresponding to the set orientation and feature state data of the trigger event includes: determining a reference coordinate axis according to the set orientation of the to-be-controlled actuators; determining a vibrating direction of the actuator according to the reference coordinate axis; in which the vibrating direction is a direction perpendicular to the reference coordinate axis; determining a corresponding vibration manner according to the feature state data of the trigger event; in which the vibration manner includes: unilateral vibration, bilateral alternating vibration, and bilateral simultaneous vibration; and generating the vibration scheme based on the actuator IDs corresponding to the set orientation, the vibrating direction, and the vibration manner.

In this embodiment, when the user holds different positions of the folding-screen mobile phone with two hands, a driving signal may drive the actuator to operate, so that three-dimensional vibration can be defined once vibration at a specific position is higher than that in other regions. That is, when the user holds the folding-screen mobile phone in different postures (such as one hand or two hands), the folding-screen mobile phone can realize local vibration at holding points in different orientations, and allow a local strong vibration region to be transferred between two holding points by changing a driven actuator or driving signal, so that the user can perceive vibration signals occurring in different regions, or perceive transfer of the vibration signals between two holding points.

Figure 3:
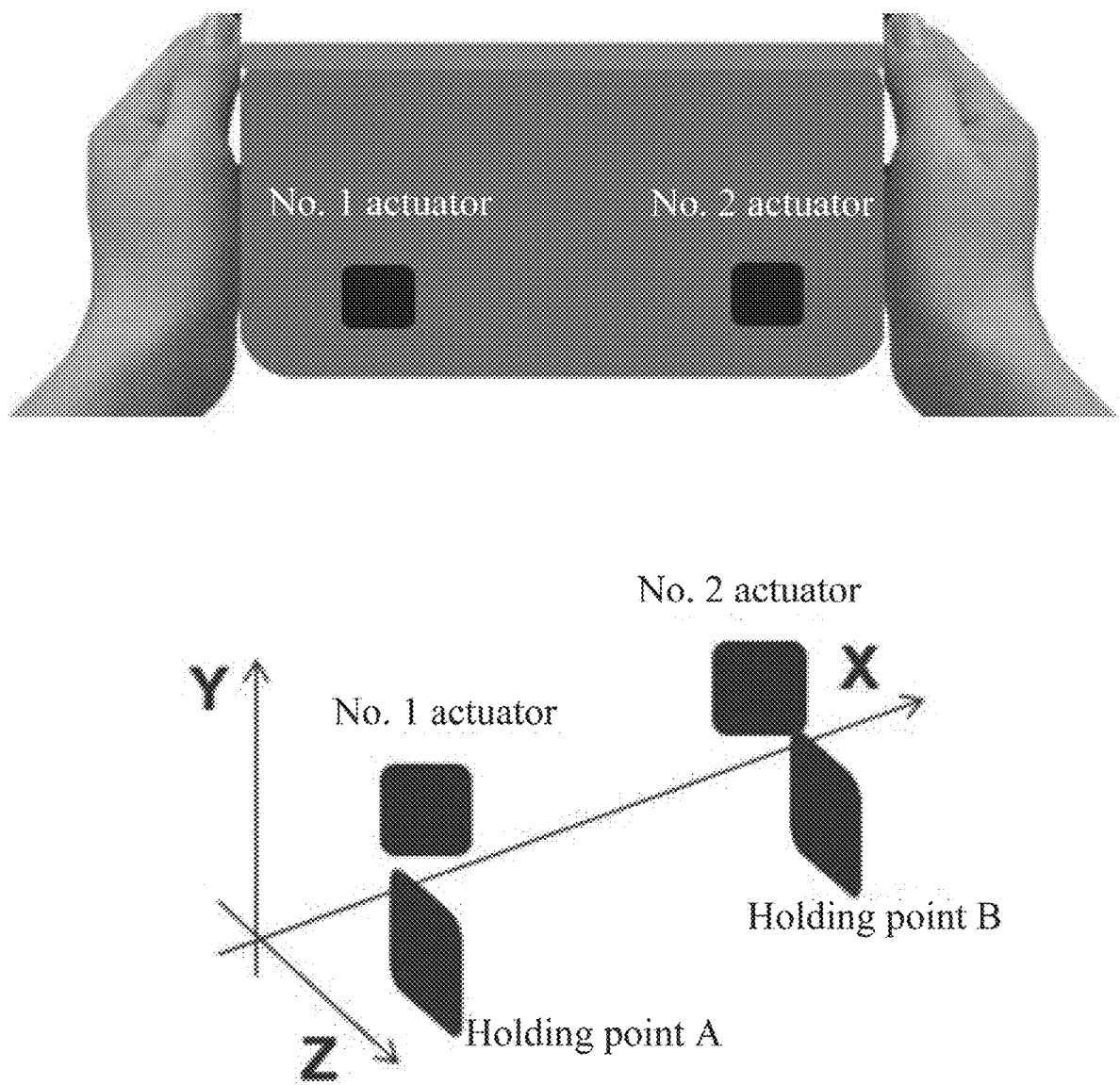
FIG. 3 is a schematic diagram of a three-dimensional vibration definition in a fully folded horizontal two-handed holding manner according to Embodiment 1 of the present disclosure.

To achieve the three-dimensional vibration in the holding manners of the second, third, fourth, and fifth manners as shown in FIG. 2, at least two actuators are required. In this embodiment, two actuators are taken as an example to illustrate the definition of three-dimensional vibration. FIG. 3 is a schematic diagram of a three-dimensional vibration definition in a fully folded horizontal two-handed holding manner. If there is a need to realize that No. 1 actuator provides strong vibration on the left side and No. 2 actuator provides strong vibration on the right side, the actuators can only provide local vibration on a single side by vibrating in an up-down direction or perpendicular to the screen of the mobile phone. That is, local vibration between holding points A and B can be realized only when the solution can realize that local vibration of a motor along directions Y and Z is stronger than that in other regions. This is because vibration in the left and right directions has basically the same impact on the two holding points, and does not have independence, so the three-dimensional vibration cannot be realized. That is, when there are independent actuators near left and right hands and vibrating directions of the actuators are perpendicular to a reference coordinate axis X-axis connecting the two actuators (or two holding points), or vibration of the actuators has a larger component perpendicular to the X-axis, independent vibration and three-dimensional vibration at the two holding points may be realized. An implementation effect of the three-dimensional vibration is related to factors such as an arrangement manner, a vibrating direction, and distribution of holding points of the actuators. After the vibrating direction of the actuators in the Y direction or Z direction is determined, the corresponding vibration scheme may be determined through feature state data of a user-triggered operation. Finally, a vibration control scheme is generated based on the vibration manner, the vibrating direction, and IDs of to-be-controlled actuators. Either or both of the directions may be selected as the vibrating direction of the actuators according to an actual requirement.

Figure 4:
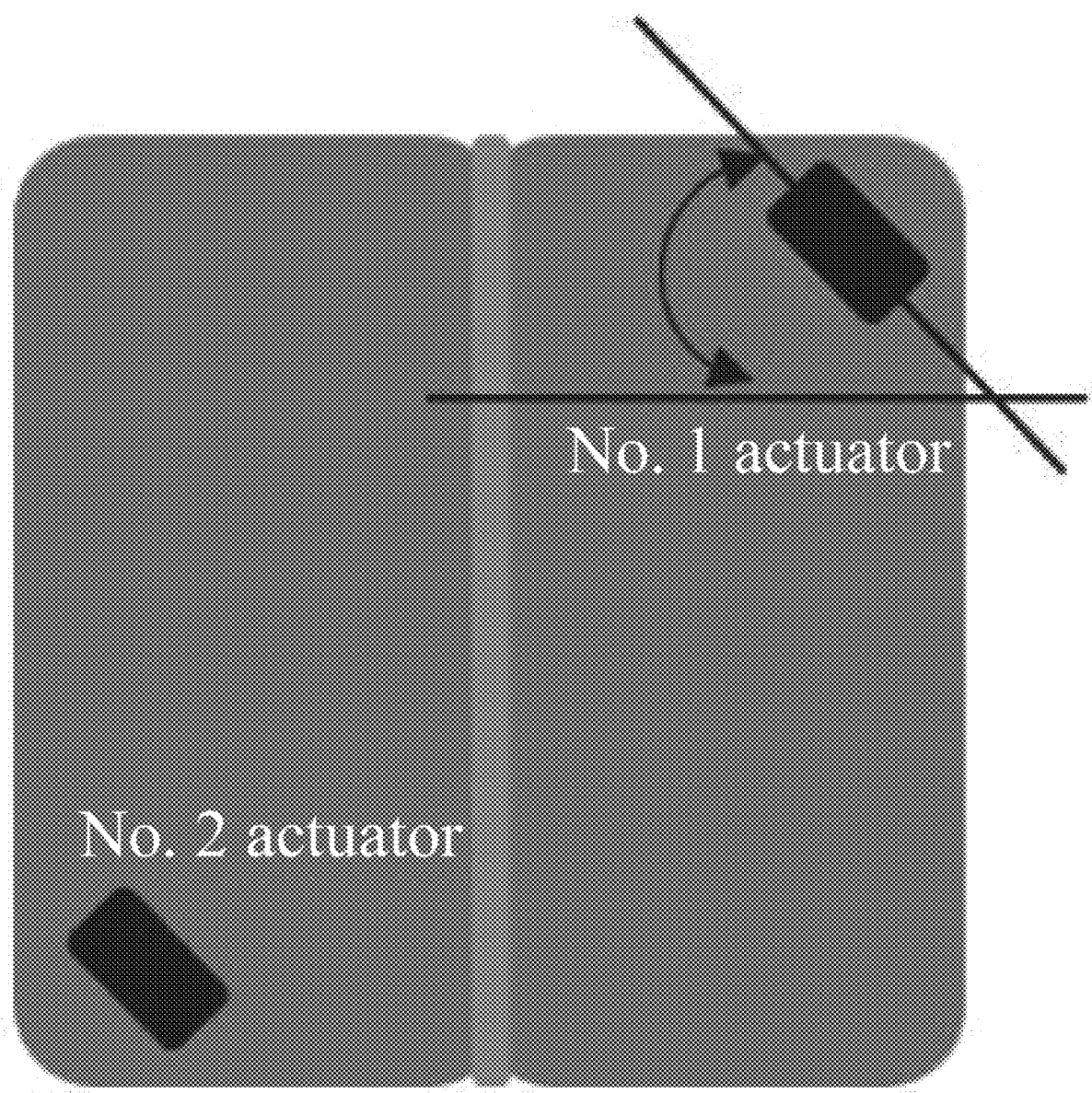
FIG. 4 is a schematic diagram of a placement manner of actuators in a fully unfolded vertical two-handed holding manner according to Embodiment 1 of the present disclosure.

In addition, it should be further noted that, in order to achieve a better three-dimensional vibration effect, during arrangement of the actuators, placement inclination angles of the actuators in different placement orientations are also required to be considered accordingly. For example, for actuators in the direction Z in FIG. 3, only placement orientations instead of the placement inclination angles are required to be considered, while for the actuators in the directions X and Y, the influence of the placement inclination angles is required to be considered. For the selection of the inclination angles, taking the placement of the actuators in the direction X as an example, the influence of the inclination angles on a vibration component in different holding manners is required to be balanced, and an optimal inclination angle is affected by a length, a width, mass distribution, and moment of inertia of the folding-screen mobile phone. Generally, the inclination angle is preferably in a range of 15° to 75°. When length and width directions of the mobile phone are completely symmetrical, the optimal inclination angle is 45°, such as the inclination angle of No. 1 actuator in the fully unfolded vertical two-handed holding manner shown in FIG. 4.

In step 104, the actuators are controlled to enter a vibration operating state correspondingly based on the vibration scheme.

In this embodiment, after the placement orientation, the actuator IDs, the vibrating direction, and the vibration manner of the to-be-controlled actuators are determined, corresponding driving information may be outputted to control the corresponding actuators to enter the vibration operating state.

In this embodiment, the step of controlling the actuators to enter a vibration operating state correspondingly based on the vibration scheme includes: controlling, when the vibration manner in the vibration scheme is the bilateral alternating vibration, a first actuator to enter a vibration operating state with a maximum vibration power value according to the corresponding vibrating direction, then reducing a power value of the first actuator according to a preset rate, simultaneously controlling a second actuator to enter the vibration operating state according to the corresponding vibrating direction, and increasing a power value of the second actuator according to the rate; in which the first actuator is an actuator corresponding to the actuator ID in either of the set orientations, and the second actuator is an actuator corresponding to the actuator ID in the other of the set orientations; and controlling, when the vibration manner in the vibration scheme is the bilateral simultaneous vibration, the first actuator and the second actuator to enter the vibration operating state according to the corresponding vibrating direction and same vibration intensity.

Figure 5:
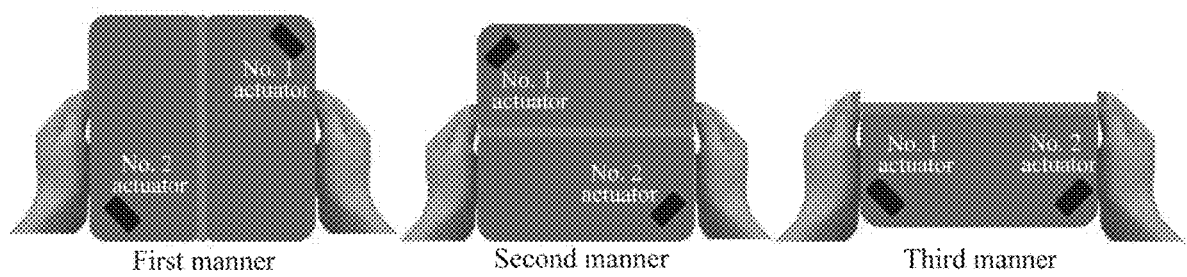
FIG. 5 is a schematic diagram of placement manners of the actuators in the folding-screen mobile phone according to Embodiment 1 of the present disclosure.

FIG. 5 is a schematic diagram of placement manners of actuators in a folding-screen mobile phone. The first manner is a placement manner of the actuators in a fully unfolded vertical two-handed holding posture, the second manner is a placement manner of the actuators in a fully unfolded horizontal two-handed holding posture, and the third manner is a placement manner of the actuators in a fully folded horizontal two-handed holding posture. In the first manner in FIG. 5, when local vibration is required on the left side of the mobile phone, No. 2 actuator is started, and when local vibration on the right side of the mobile phone is required, No. 1 actuator is started.

When the user is required to perceive that vibration is transferred from the right side to the left side, No. 1 actuator is first started and power thereof is quickly maximized, then the power of the No. 1 actuator is gradually reduced, No. 2 actuator is then started and power of No. 2 actuator is gradually increased, and a power increase speed of No. 2 actuator is consistent with a power decrease speed of No. 1 actuator. A feedback form of vibration transfer is realized through a speed of power change. On the contrary, when the user is required to perceive the vibration transferred from the left side to the right side, the control over the actuators is opposite thereto. When two sides (such as upper and lower sides) are required to embody vibration at the same time, the two actuators are loaded with signals with same amplitude and reverse phases at the same time, so that the mobile phone vibrates in an oscillating state to increase the vibration at an edge of the mobile phone close to a hand region. The vibration manner can ensure three-dimensional vibration in different holding manners, such as a fully unfolded horizontal, a partially unfolded horizontal, and a fully folded horizontal.

Based on the technical solution in this embodiment of the present disclosure above, when a trigger event acting on the folding screen is received, current state data of the electronic device and application software information associated with the trigger event are acquired; a holding type corresponding to the trigger event is determined according to the current state data and the application software information; in which the holding type includes fully folded vertical one-handed holding, half folded horizontal two-handed holding, fully unfolded vertical two-handed holding, and fully unfolded horizontal two-handed holding; a corresponding vibration scheme is determined according to the holding type; and the actuators are controlled to enter a vibration operating state correspondingly based on the vibration scheme. Through implementation of the solutions of the present disclosure, after a type of holding a device by a user is determined, a vibration scheme of a corresponding type is adopted, so as to control the corresponding actuators for vibration feedback in real time to make three-dimensional vibration response to different trigger events, which improves vibration experience.

Figure 6:
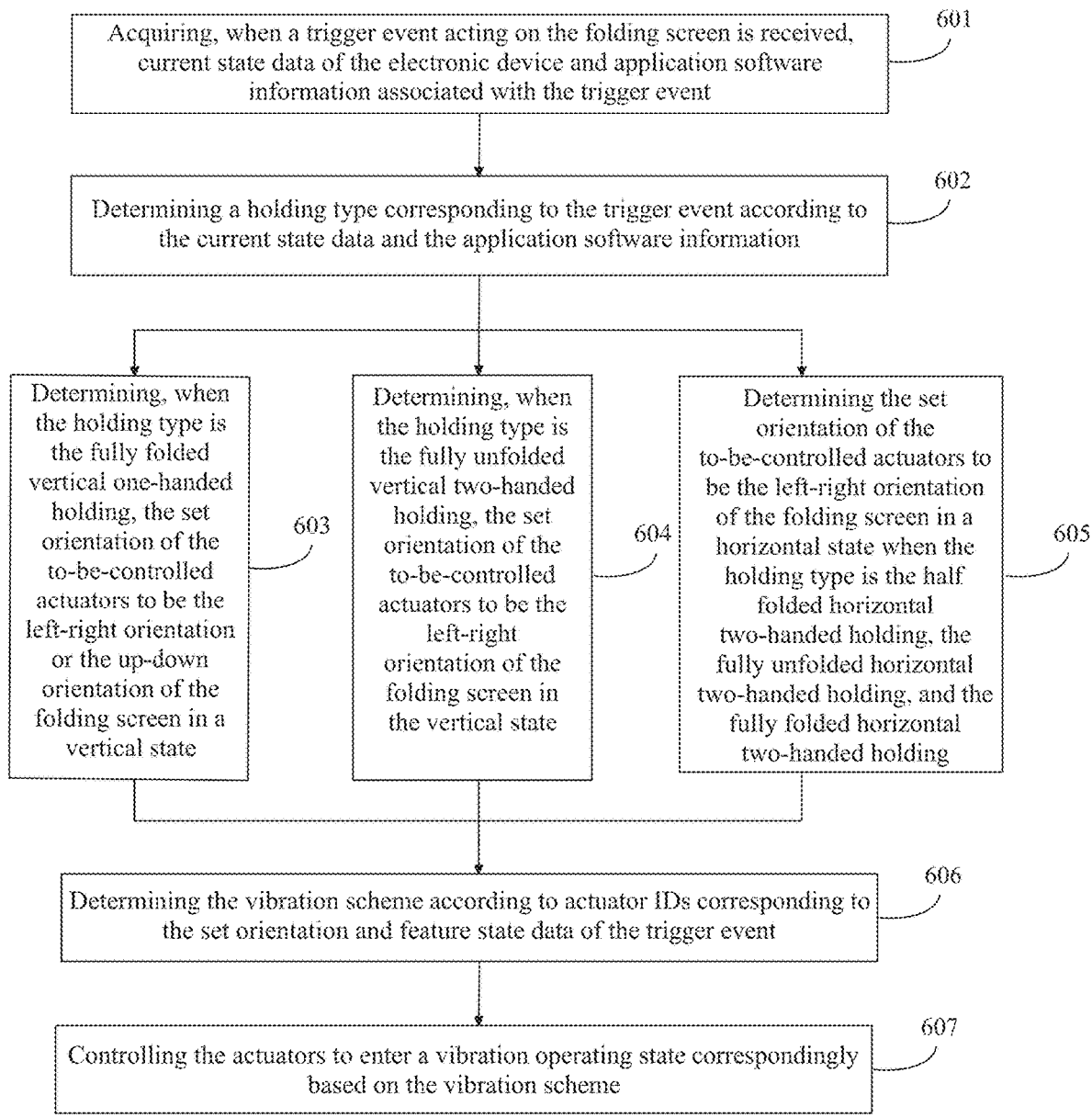
FIG. 6 is a schematic refined flowchart of a three-dimensional vibration control method according to Embodiment 2 of the present disclosure.

The method in FIG. 6 is a refined three-dimensional vibration control method according to Embodiment 2 of the present disclosure. The three-dimensional vibration control method includes the following steps.

In step 601, when a trigger event acting on the folding screen is received, current state data of the electronic device and application software information associated with the trigger event are acquired.

In step 602, a holding type corresponding to the trigger event is determined according to the current state data and the application software information.

In step 603, when the holding type is the fully folded vertical one-handed holding, the set orientation of the to-be-controlled actuators is determined to be the left-right orientation or the up-down orientation of the folding screen in a vertical state.

In step 604, when the holding type is the fully unfolded vertical two-handed holding, the set orientation of the to-becontrolled actuators is determined to be the left-right orientation of the folding screen in the vertical state.

In step 605, when the holding type is the half folded horizontal two-handed holding, the fully unfolded horizontal two-handed holding, and the fully folded horizontal two-handed holding, the set orientation of the to-be-controlled actuators is determined to be the left-right orientation of the folding screen in a horizontal state.

In step 606, the vibration scheme is determined according to actuator IDs corresponding to the set orientation and feature state data of the trigger event.

In step 607, the actuators are controlled to enter a vibration operating state correspondingly based on the vibration scheme.

Figure 7:
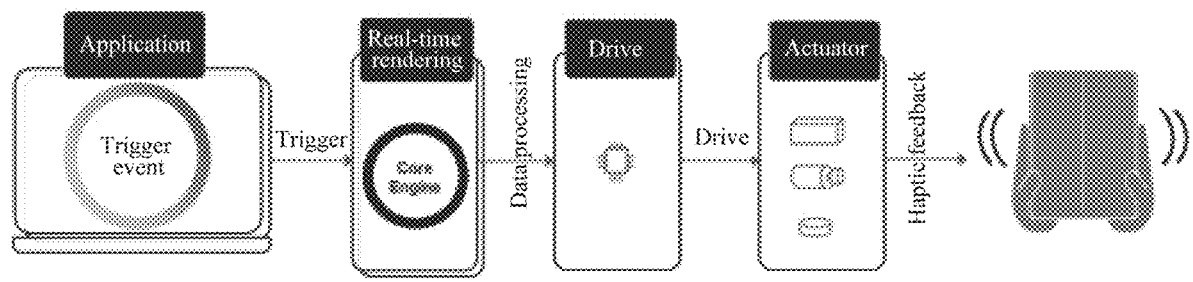
FIG. 7 is a schematic flowchart of the three-dimensional vibration control method according to Embodiment 2 of the present disclosure.

FIG. 7 is a schematic flowchart of a three-dimensional vibration control method. In this embodiment, according to requirements of application development and experience design, once an application receives a trigger event, a reliable, cross-platform, timely updated, and powerful software interface scheme may be issued. As the most critical part of implementing a haptic description file to a control device, a core engine module Core Engine may perform haptic rendering and may achieve real-time partial rendering and overall rendering. The core engine module may provide optimal effect control and device protection methods, including a variety of optimization algorithm modules to decode, render and modify original haptic files so that haptic information can be fully parsed and restored to produce customized and better haptic experience effects, and continuously upgrade and improve based on haptic understanding. In addition, the core engine module is also responsible for interaction with multiple modules in the system, supports a variety of driving chips at the same time, such as RT6010, AW8697, AW86917, and DW7914, may be designed and controlled by a system integrator, may support interface adaptation and optimization of different driving, may implement customized signal optimization processes, support multiple types of devices, multi-channel haptic feedback effect control and playback, and in multi-channel control playback, may adjust and output automatic control signals according to different holding directions. According to results detected by the sensors in the folding-screen mobile phone, the core engine module processes playback data exchange of the channels to realize rotational matching between the three-dimensional vibration and playback content in the device. Therefore, a principle basis of the three-dimensional vibration is realized by placing multiple actuators in a specific manner on the folding-screen mobile phone, and driving control is achieved through software control, so as to achieve three-dimensional vibration effects in different holding manners.

It should be understood that values of sequence numbers of the steps in this embodiment do not indicate execution sequences, and the execution sequence of the steps should be determined according to functions and inherent logic thereof, but should not constitute an only limitation on implementation processes of the embodiments of the present disclosure.

Figure 8:
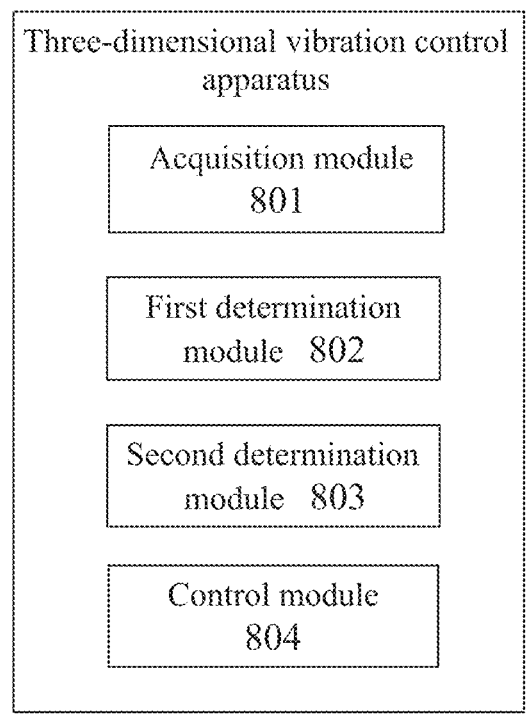
FIG. 8 is a schematic diagrams of modules of a three-dimensional vibration control apparatus according to Embodiment 3 of the present disclosure.

FIG. 8 illustrates a three-dimensional vibration control apparatus according to Embodiment 3 of the present disclosure, which is applied to an electronic device including a folding screen. The electronic device includes a plurality of actuators, and the folding screen is foldable to form at least two screens. Moreover, the three-dimensional vibration control apparatus is also applicable to the foregoing three-dimensional vibration control method. As shown in FIG. 8, the three-dimensional vibration control apparatus mainly includes:

an acquisition module 801 configured to acquire, when a trigger event acting on the folding screen is received, current state data of the electronic device and application software information associated with the trigger event;

a first determination module 802 configured to determine a holding type corresponding to the trigger event according to the current state data and the application software information; in which the holding type includes fully folded vertical one-handed holding, fully folded horizontal two-handed holding, half folded horizontal two-handed holding, fully unfolded vertical two-handed holding, and fully unfolded horizontal two-handed holding;

a second determination module 803 configured to determine a corresponding vibration scheme according to the holding type; and a control module 804 configured to control the actuators to enter a vibration operating state correspondingly based on the vibration scheme.

In this embodiment, the three-dimensional vibration control apparatus further includes: a matching module configured to acquire feature state data corresponding to the trigger event; in which the feature state data includes operating pressure data, operating displacement data, and operating frequency data; match values of the feature state data with a corresponding preset threshold range; and cause the acquisition module to perform the function of acquiring current state data of the electronic device and application software information associated with the trigger event when the matching is successful; in which the current state data includes angular velocity data and gravity data.

In this embodiment, the first determination module is configured to determine an orientation of the folding screen relative to a device user based on the current state data; and determine the holding type corresponding to the trigger event according to the orientation and identification information of application software.

In this embodiment, the second determination module is configured to determine a set orientation of to-be-controlled actuators according to the holding type; in which the set orientation includes: a left-right orientation and an up-down orientation; and determine the vibration scheme according to actuator IDs corresponding to the set orientation and feature state data of the trigger event.

Further, in this embodiment, the second determination module is further configured to determine, when the holding type is the fully folded vertical one-handed holding, the set orientation of the to-be-controlled actuators to be the left-right orientation or the up-down orientation of the folding screen in a vertical state; determine, when the holding type is the fully unfolded vertical two-handed holding, the set orientation of the to-be-controlled actuators to be the left-right orientation of the folding screen in the vertical state; and determine, when the holding type is the half folded horizontal two-handed holding, the fully unfolded horizontal two-handed holding, and the fully folded horizontal two-handed holding, the set orientation of the to-be-controlled actuators to be the left-right orientation of the folding screen in a horizontal state.

Furthermore, in this embodiment, the second determination module is further configured to determine a reference coordinate axis according to the set orientation of the to-be-controlled actuators; determine a vibrating direction of the actuator according to the reference coordinate axis; in which the vibrating direction is a direction perpendicular to the reference coordinate axis; determine a corresponding vibration manner according to the feature state data of the trigger event; in which the vibration manner includes: unilateral vibration, bilateral alternating vibration, and bilateral simultaneous vibration; and generate the vibration scheme based on the actuator IDs corresponding to the set orientation, the vibrating direction, and the vibration manner.

In this embodiment, the control module is configured to control, when the vibration manner in the vibration scheme is the bilateral alternating vibration, a first actuator to enter a vibration operating state with a maximum vibration power value according to the corresponding vibrating direction, then reduce a power value of the first actuator according to a preset rate, simultaneously control a second actuator to enter the vibration operating state according to the corresponding vibrating direction, and increase a power value of the second actuator according to the rate; in which the first actuator is an actuator corresponding to the actuator ID in either of the set orientations, and the second actuator is an actuator corresponding to the actuator ID in the other of the set orientations; and control, when the vibration manner in the vibration scheme is the bilateral simultaneous vibration, the first actuator and the second actuator to enter the vibration operating state according to the corresponding vibrating direction and same vibration intensity.

It should be noted that the three-dimensional vibration control method in the foregoing embodiments may be implemented based on the three-dimensional vibration control apparatus provided in this embodiment. Those of ordinary skill in the art may clearly understand that, for the convenience and simplicity of description, a specific operating process of the three-dimensional vibration control apparatus described in this embodiment may be obtained with reference to the corresponding process in the foregoing method embodiment. Details are not described herein again.

Figure 9:
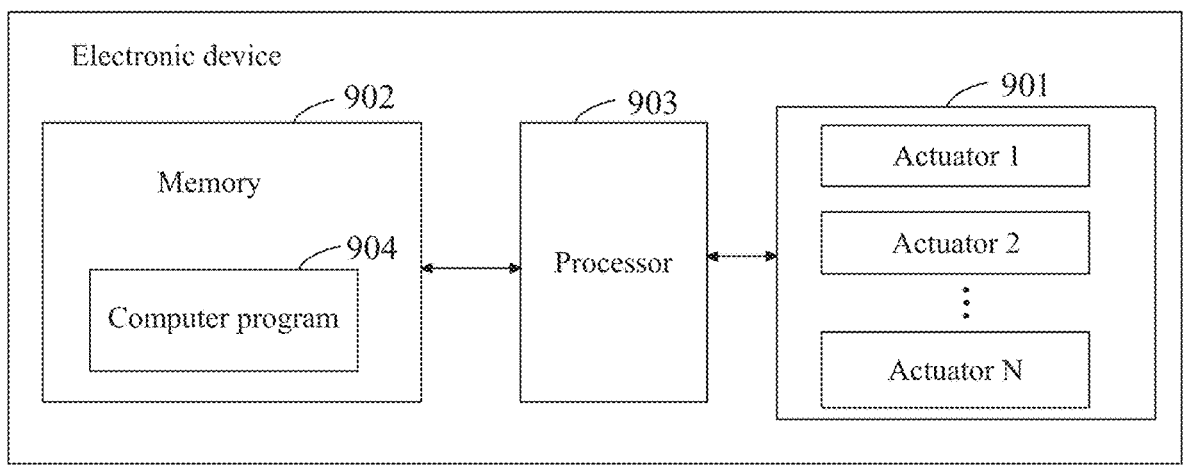
FIG. 9 is a schematic structural diagram of an electronic device according to Embodiment 4 of the present disclosure.

FIG. 9 is a schematic structural diagram of an electronic device according to Embodiment 4 of the present disclosure. The electronic device may be configured to implement the three-dimensional vibration control method in the foregoing embodiments, which mainly includes: actuators 901, a memory 902, a processor 903, and a computer program 904 stored in the memory 902 and executable by the processor 903. The memory 902 and the processor 903 are connected through communication. The processor 903, when executing the computer program 904, implements the method in the foregoing embodiments. One or more processors may be provided, and a plurality of actuators may be provided.

The memory 902 may be a high-speed random access memory (RAM), or may be a non-volatile memory such as a magnetic disk memory. The memory 902 is configured to store executable program code, and the processor 903 is coupled to the memory 902.

Further, the present disclosure further provides a non-transitory computer-readable storage medium. The non-transitory computer-readable storage medium may be arranged in the above electronic device. The non-transitory computer-readable storage medium may be the memory in the embodiment shown in FIG. 9 above.

The non-transitory computer-readable storage medium stores a computer program. When the program is executed by a processor, the three-dimensional vibration control method in the foregoing embodiments is implemented. Further, the non-transitory computer-readable storage medium may alternatively be any medium that can store program code such as a USB flash disk, a mobile hard disk, a read-only memory (ROM), a RAM, a magnetic disk, or an optical disc.

In some embodiments provided in the present disclosure, it should be understood that the apparatus and method disclosed may be implemented in other manners. For example, the apparatus embodiments described above are only illustrative. For example, the division of the modules is merely logical function division, and there may be other division manners in an actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between apparatuses or modules may be implemented in an electric form, a mechanical form, or other forms.

The modules described as separate parts may or may not be physically separate, and parts displayed as modules may or may not be physical modules, may be located at one position, or may be distributed on a plurality of network modules. Some or all of the modules may be selected according to actual requirements to achieve the objective of the solution of this embodiment.

In addition, the functional modules in the embodiments of the present disclosure may be integrated into one processing module, or each of the modules may exist alone physically, or two or more modules are integrated into one module. The integrated module may be implemented in a form of hardware or in a form of a software functional module.

The integrated module may be stored in a non-transitory computer-readable storage medium when implemented in the form of the software functional module and sold or used as a separate product. Based on such an understanding, the technical solutions in the present disclosure essentially, or the part contributing to the related art, or some of the technical solutions may be implemented in the form of a software product. The computer software product is stored in a readable storage medium, and includes several instructions for causing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a ROM, a RAM, a magnetic disk, or an optical disc.

It is to be noted that, to make the description brief, the foregoing method embodiments are expressed as a series of actions. However, those skilled in the art should appreciate that the present disclosure is not limited to the described action sequence, because according to the present disclosure, some steps may be performed in other sequences or performed simultaneously. In addition, those skilled in the art should also appreciate that all the embodiments described in the specification are preferred embodiments, and the related actions and modules are not necessarily mandatory to the present disclosure.

In the above embodiments, the descriptions of the embodiments have respective focuses. For a part that is not described in detail in one embodiment, refer to related descriptions in other embodiments.

The above are descriptions about the three-dimensional vibration control method, the apparatus, the device, and the storage medium provided in the present disclosure. For those skilled in the art, there may be changes in specific embodiments and an application scope based on the ideas of the embodiments of the present disclosure. In summary, the content of this specification should not be understood as a limitation on the present disclosure.

What is claimed is:

1. A three-dimensional vibration control method, applied to an electronic device comprising a folding screen, wherein the electronic device comprises a plurality of actuators, and the folding screen is foldable to form at least two screens, and the three-dimensional vibration control method comprises:
   acquiring, when a trigger event acting on the folding screen is received, current state data of the electronic device and application software information associated with the trigger event;
   determining a holding type corresponding to the trigger event according to the current state data and the application software information, wherein the holding type comprises fully folded vertical one-handed holding, fully folded horizontal two-handed holding, half folded horizontal two-handed holding, fully unfolded vertical two-handed holding, and fully unfolded horizontal two-handed holding;
   determining a corresponding vibration scheme according to the holding type; and
   controlling the actuators to enter a vibration operating state correspondingly based on the vibration scheme.

2. The three-dimensional vibration control method as described in claim 1, prior to the acquiring current state data of the electronic device and application software information associated with the trigger event, further comprising:
   acquiring feature state data corresponding to the trigger event, wherein the feature state data comprise operating pressure data, operating displacement data, and operating frequency data;
   matching values of the feature state data with a corresponding preset threshold range; and
   performing the acquiring current state data of the electronic device and application software information associated with the trigger event when the matching is successful, wherein the current state data comprises angular velocity data and gravity data.

3. The three-dimensional vibration control method as described in claim 2, wherein the determining a holding type corresponding to the trigger event according to the current state data and the application software information comprises:
   determining an orientation of the folding screen relative to a device user based on the current state data; and
   determining the holding type corresponding to the trigger event according to the orientation and identification information of application software.

4. The three-dimensional vibration control method as described in claim 1, wherein the determining a corresponding vibration scheme according to the holding type comprises:
   determining a set orientation of to-be-controlled actuators according to the holding type; wherein the set orientation comprises: a left-right orientation and an up-down orientation; and
   determining the vibration scheme according to actuator IDs corresponding to the set orientation and feature state data of the trigger event.

5. The three-dimensional vibration control method as described in claim 4, wherein the determining a set orientation of to-be-controlled actuators according to the holding type comprises:
   determining, when the holding type is the fully folded vertical one-handed holding, the set orientation of the to-be-controlled actuators to be the left-right orientation or the up-down orientation of the folding screen in a vertical state;
   determining, when the holding type is the fully unfolded vertical two-handed holding, the set orientation of the to-be-controlled actuators to be the left-right orientation of the folding screen in the vertical state; and
   determining the set orientation of the to-be-controlled actuators to be the left-right orientation of the folding screen in a horizontal state when the holding type is the half folded horizontal two-handed holding, the fully unfolded horizontal two-handed holding, and the fully folded horizontal two-handed holding.

6. The three-dimensional vibration control method as described in claim 4, wherein the determining the vibration scheme according to actuator IDs corresponding to the set orientation and feature state data of the trigger event comprises:
   determining a reference coordinate axis according to the set orientation of the to-be-controlled actuators;
   determining a vibrating direction of the actuator according to the reference coordinate axis, wherein the vibrating direction is a direction perpendicular to the reference coordinate axis;
   determining a corresponding vibration manner according to the feature state data of the trigger event, wherein the vibration manner comprises: unilateral vibration, bilateral alternating vibration, and bilateral simultaneous vibration; and
   generating the vibration scheme based on the actuator IDs corresponding to the set orientation, the vibrating direction, and the vibration manner.

7. The three-dimensional vibration control method as described in claim 6, wherein the controlling the actuators to enter a vibration operating state correspondingly based on the vibration scheme comprises:
   controlling, when the vibration manner in the vibration scheme is the bilateral alternating vibration, a first actuator to enter a vibration operating state with a maximum vibration power value according to the corresponding vibrating direction, then reducing a power value of the first actuator according to a preset rate, simultaneously controlling a second actuator to enter the vibration operating state according to the corresponding vibrating direction, and increasing a power value of the second actuator according to the rate, wherein the first actuator is an actuator corresponding to the actuator ID in either of the set orientations, and the second actuator is an actuator corresponding to the actuator ID in the other of the set orientations; and
   controlling, when the vibration manner in the vibration scheme is the bilateral simultaneous vibration, the first actuator and the second actuator to enter the vibration operating state according to the corresponding vibrating direction and same vibration intensity.

8. A three-dimensional vibration control apparatus, applied to an electronic device comprising a folding screen, the electronic device comprising a plurality of actuators, and the folding screen being foldable to form at least two screens, wherein the apparatus comprises:
   an acquisition module configured to acquire, when a trigger event acting on the folding screen is received, current state data of the electronic device and application software information associated with the trigger event;

a first determination module configured to determine a holding type corresponding to the trigger event according to the current state data and the application software information, wherein the holding type comprises fully folded vertical one-handed holding, fully folded horizontal two-handed holding, half folded horizontal two-handed holding, fully unfolded vertical two-handed holding, and fully unfolded horizontal two-handed holding;

a second determination module configured to determine a corresponding vibration scheme according to the holding type; and a control module configured to control the actuators to enter a vibration operating state correspondingly based on the vibration scheme.

9. A non-transitory computer-readable storage medium, storing a computer program thereon, wherein steps in the three-dimensional vibration control method as described in claim 1 are implemented when the computer program is executed by a processor.

* * * * *